United States Patent [19]

Johnston

[11] 3,809,818

[45] May 7, 1974

[54] MEANS AND METHOD FOR TELEPHONE LINE DISCONNECTION IN FREQUENCY DIVISION MULTIPLEXING

[75] Inventor: Walter Daniel Johnston, Pierrefond, Quebec, Canada

[73] Assignee: Bell Canada, Montreal, Quebec, Canada

[22] Filed: June 5, 1972

[21] Appl. No.: 259,458

[52] U.S. Cl....... 179/15 BY, 179/15 FD, 179/175.3

[51] Int. Cl............................................... H04j 1/14

[58] Field of Search........ 179/15 FD, 15 BP, 15 BF, 179/15 AL, 2.5, 175.3, 175.31, 16 R, 84 UF, 15 BS, 15 BY; 178/69.5

[56] References Cited

UNITED STATES PATENTS

| | | | |
|---|---|---|---|
| 2,790,029 | 4/1957 | Hansen | 179/15 BP |
| 2,680,162 | 6/1954 | Brehm | 179/175.3 |
| 3,458,661 | 7/1969 | Forde | 179/15 AL |
| 2,733,296 | 1/1956 | Maggio | 179/2.5 R |
| 2,986,610 | 5/1961 | Maurushat | 179/175.3 |
| 3,045,070 | 7/1962 | Kallsson | 179/15 BP |
| 3,436,487 | 4/1969 | Blane | 179/2 DP |

*Primary Examiner*—William C. Cooper
*Assistant Examiner*—Thomas D'Amico

[57] ABSTRACT

Transmission failure in frequency division multiplexing connected to telephone systems results in the generation of a disconnect tones, one for each carrier, which are simultaneously superimposed on the multiplex link to achieve disconnection of telephone lines and trunks.

10 Claims, 3 Drawing Figures

MEANS AND METHOD FOR TELEPHONE LINE DISCONNECTION IN FREQUENCY DIVISION MULTIPLEXING

This invention deals with the transmission of information over frequency division multiplexing systems, where such information is received by the multiplexing system from and transmitted by the multiplexing system to lines and trunks of a telephone system, and the invention relates to means and a method for applying switching signals to such associated lines and trunks in the event of failure in transmission by the multiplex system.

When frequency division multiplex transmission fails between associated frequency lines and trunks, it is necessary to disconnect the lines and trunks affected by the transmission failure. This disconnection is required: inter alia, to prevent mass seizure of common control equipment in switching offices, to stop charging on calls in progress and to release the lines and trunks utilized by calls interrupted by such failure.

Prior methods of disconnecting such lines and trunks on multiplexing system failure, have required a relay for each trunk or line connected to the multiplexing system, this has required a large amount of office space, equipment and cabling.

This invention provides method and means for disconnecting the associated lines and trunks of a telephone system associated with a multiplex system, on failure of the latter, without the need of relay equipment for each trunk or line. The invention is useful with telephone systems wherein the switching in the telephone system associated with the termination of a call, is initiated by a signal of predetermined frequency either within the band of frequencies normally carrying (over the frequency division multiplex system) information for the telephone system or outside the band, but within the frequency range reserved for the call in the multiplexing system.

The principle of the invention is associated with the fact that termination of a call in a telephone system at one end normally provides a signal, within the range of frequencies reserved for the call in its transmission through a frequency division multiplexing system, which effects at the other end, the switching consequent upon termination of a call. In a frequency division multiplexing system, as is well known, the information signal or the disconnect signal just referred to, received from the telephone system, are modulated on a carrier. Pluralities of the carriers are combined in groups wherein the carriers are usually equally spaced in frequency from each other, and travel a common path for modulation on other carriers which in turn may be combined in 'supergroups' (where a larger number of carriers follow a common path) 'master groups'; 'jumbo groups' and so on, for transmission over the multiplex system. The multiplexing process is reversed at the receiving ends, with the supergroups demodulated to groups, the groups demodulated to carriers from where the original signal is demodulated for transmission over the telephone system. The term 'channel' refers to the path appropriated to information and disconnect signals, associated with a single telephone call, into, through, and out of the multiplexing heirarchy. It will be noted that at any stage in the multiplexing heirarchy, a signal on any of the channels of a preselected frequency, selected to effect disconnecting switching in the telephone system receiving said signal, will appear as the modulating frequency on a modulated carrier signal or as a component of the modulated carrier signal and when demodulated, and supplied to the telephone system such preselected frequency signal will, of course, cause disconnection in that part of the telephone system receiving said signal. The principle of the invention, therefore, is to make available at a predetermined path in a stage in the multiplexing heirarchy, a plurality of signals comprising a spectrum of tones (hereafter defined as disconnect tones) including a signal having a frequency corresponding to each of the carrier or carriers there located, when modulated by a signal of such preselected frequency. Such plurality of signals is normally disconnected from said path but, in accord with the invention, are supplied thereto in response to the detection of failure in the multiplex system to achieve the disconnection of associated telephone circuitry. of associated telephone circuitry.

By disconnect tone herein, is meant a carrier modulated by the signal or tone used in the telephone system to initiate the switching incidental to the termination of a call. Such signal or tone will, in some systems, be the same tone as is used to signal an idle line.

In conventional systems, for example, the frequency range reserved in a frequency division multiplexing system, for a speech or data channel is 4 kHz. Of this range the speech or data transmitted, provides a modulating telephone system frequency of 300 to 3,400 Hz. At the present time the signal to cause switching in a telephone system incidental on disconnection, is a signal of 2,600 Hz which, it is noted, is within the information signalling band. The disconnect tone for the purpose of the invention may, equally well, be outside the band, that is within the 4kHz. , channel but outside of the 300 – 3,400 Hz. signal carrying the information.

In accord with the invention, there is provided for use in the event of a failure of transmission in the multiplex system associated with a common path for a plurality of carriers, a corresponding plurality of disconnect tones, each switching signal having the frequency of one of the carriers, when modulated by the signal which will cause release of connected lines and trunks of the telephone system receiving the signals demodulated from such carriers. On the detection of such multiplex system failure such plurality of disconnect tones are applied to the common path so that demodulation of these tones causes the necessary switching incident upon termination of a call in the lines and trunks of the telephone system connected to receive the information carried on the common path. Obviously to be effective, the disconnect tones must be applied to a path in the multiplexing heirarchy on the reception side of the detected transmission failure. However, usually a transmission failure of transmission in one direction on a multiplexing system usually requires disconnection of the lines receiving a different but associated multiplex transmission in the the opposite direction, (e.g., in a two-way telephone conversation). Thus the invention is usually used to apply disconnect tones to the failed multiplex heirarchy at the receiving end, in response to failure, but also to apply such switching tones to a counterpart path in the transmitting end of the counterpart multiplex heirarchy carrying the other direction transmission for two-way communication, for causing disconnection at the telephone receiving lines, receiving information through the counterpart multiplexing system.

In the drawings which illustrate a preferred embodiment of the invention:

Figure 1:
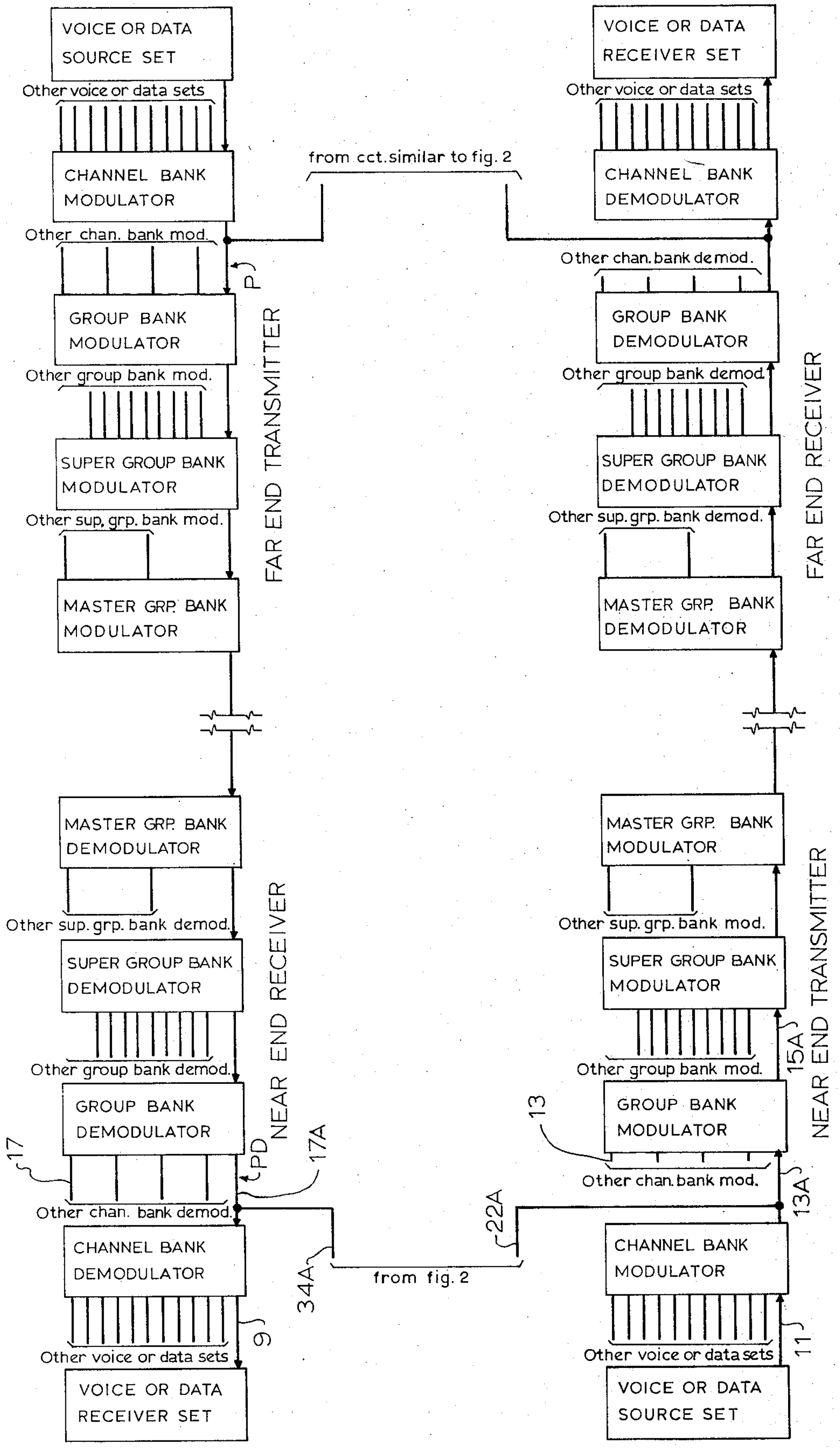
FIG. 1 shows a typical multiplexing heirarchy.

In the drawings, FIG. 1 shows a typical multiplexing heirarchy wherein, at the near transmit side, 12 voice or data lines 11 each designated to carry information signals of frequency between 300 and 3,400 Hz, originating for example, with a voice source or data set, are connected to a channel bank modulator, designed in accord with well known techniques to provide carrier signals at 108 to 60 kHz. at 4 kHz. intervals, respectively modulated here for single (here lower) sideband transmission in accord with the signalling frequency within the 300 to 3,400 Hz. range of the corresponding voice or data channel. The output of the channel bank modulator along with four other similar outputs follow paths 13 and are combined at a group bank modulator, whose output 15 therefore usually carries sixty of the original channels spaced at 4 kHz. intervals over a frequency of 312 to 552 kHz. and which in turn may be further combined or 'multiplexed' as defined successively in multiplex heirarchical terms as supergroup modulators (600 channels), master group bank modulators (1,200, 1,800 or 3,600 channels), and jumbo bank modulators (up to 9,000 channels). Alternatively, any one or more of the upper stages of the multiplexing heirarchy may be omitted. For example, under older frequency division multiplexing systems the output of the channel bank modulator carrying 12 channels on a path 13 is transmitted directly without further multiplexing. As FIG. 1 shows, to the near (here left-hand side) transmission end there is coupled (by wire or radio) a receiver end (here right-hand side) wherein the multiplexed transmission is stepped down in demodulation stages which are counterparts in the heirarchy of the modulation stage. There is also shown (upper left) the receiving portion of a counterpart multiplexing heirarchy having a remote transmission (modulating) end and a near receiving (demodulating) end. Thus a two-way telephone conversation considered relative to the near end will transmit intelligence through the near end multiplex transmitter (through the lower multiplex system) and receive information through the near end multiplex receiver (the upper multiplex system).

The telephone circuits, not shown, connected to the output 9 of each receive channel bank demodulator are designed in accord with well known techniques to be disconnected by a signal of predetermined frequency demodulated from a carrier received through the multiplex transmission system. Further, a signal of said predetermined frequency modulated on an appropriate carrier appearing at the output of a channel bank modulator will cause disconnection of telephone circuitry connected to the receiving end of the multiplex system, to receive the demodulated signal of such predetermined frequency.

The invention comprises the method and means for adding (responsive to multiplex system failure) at a common path for a plurality of carriers in the multiplex system, disconnect tones corresponding to the frequency of carriers normally carried in said path when modulated by a signal of the frequency which causes switching in the connected telephone system incidental to disconnection. The conventional frequency used to achieve such disconnect switching is 2,600 Hz. The preferred location for adding such switching signals is at the output of the channel bank modulator to a path or paths 13, and at the input of the channel bank demodulator to a path or paths 17. The invention therefore, is designed to provide a source 19 of a spectrum of disconnect tones of frequencies at 105.4, 101.4, 97.4 . . . 61.4 kHz corresponding to the lower side bands of carriers having the frequencies 108, 104, 100 . . . 64 kHz. when modulated by a 2,600 Hz. signal. This spectrum is made available through a normally open connection to the near end channel bank modulator outputs on paths 13 and the near end channel bank demodulator inputs 17. When a transmission failure is detected at the near receiving end, the connection is closed at switches 26 and 32 to the modulator outputs and demodulator inputs. The result is that at the near receiving end and at the far receiving end, the demodulated outputs of the channel bank demodulators each carry the tone 2,600 Hz. which is transmitted to the telephone system to cause switching incidental to disconnecting the lines and trunks of the telephone systems connected thereto. Thus the disconnection of all telephone circuits at the receiving end of the multiplex system to which the switching signals have been added in the multiplex system, in response to transmission failure, is achieved with a minimum of connections. It is noted that where, as is usual, all the channel bank modulator outputs are designed for the same set (here 108 to 64 kHz). of frequency carriers and all the channel bank demodulator inputs are designed for the same set (here 108 to 64 kHz.) of frequency carriers, a single source of such spectrum of disconnect tones properly selected, may be available for supply to all channel bank modulator output paths and all channel bank demodulator input paths to provide the switching which will effect the disconnecting switching in connected telephone lines and trunks connected to multiplex receiving ends. The capability to use a single spectrum source holds true where the switching signals are applied at a different path (than lines 13 and 17) in the multiplexing heirarchy say, at the output path of a group bank modulator or the input path to a group bank demodulator. It will be noted that a 4 kHz. frequency range is reserved for all channels while the information only uses 3 kHz of this (an unmodulated frequency of 300 to 3,400 Hz). It will be obvious that the signal used to achieve disconnection must be within the frequency range reserved for each channel but may be inside or outside the narrower information range. It will also be noted that the invention not only provide a switching signal corresponding to carriers and channels then in use but also corresponding to carriers which are modulated by the idle signals since no call is then being carried thereon. Where the added switching signal to cause the switching incidental to disconnection coincides with the idle tone signal, there might be thought to be a risk of phase cancellation between the conventional idle tone and the tone added by the switching signal (assuming, as is usual, that the disconnect tone for the telephone switching system is the same as the idle tone). However, this is a minimal risk since the phase will be varying continuously. If it is felt necessary however, the added tone could be transmitted at a higher level, say −5 to −15 dbm0 which will avoid the problem completely and will minimize the tone.

The inventive means and method may be applied to other locations in the multiplexing system than the modulator output and demodulator input of the group banks. If applied to the group bank modulator output and demodulator input (where, customarily 60 carriers travel the same path) a spectrum of sixty disconnect tone would be required corresponding to the sixty carrier frequencies when modulated by the disconnect frequency (here 2,600 Hz); at the supergroup bank modulator output and demodulator input (where customarily 600 carriers travel the same path) there is required a spectrum of 600 frequencies, and so on. For a best compromise between the minimum number of connections and wiring requiring addition of the disconnect tones at a higher level in the multiplexing heirarchy and the minimum complexity of production of a spectrum of frequencies, tending toward connection at a lower level in the multiplexing heirarchy, is felt to result in applying a spectrum of twelve disconnect tones to the channel bank modulator output and demodulator input. In the older forms of frequency division multiplexing, the provision of twelve carriers on a path is, in any event, the highest level in the heirarchy since the twelve carriers are transmitted in this form.

Figure 2:
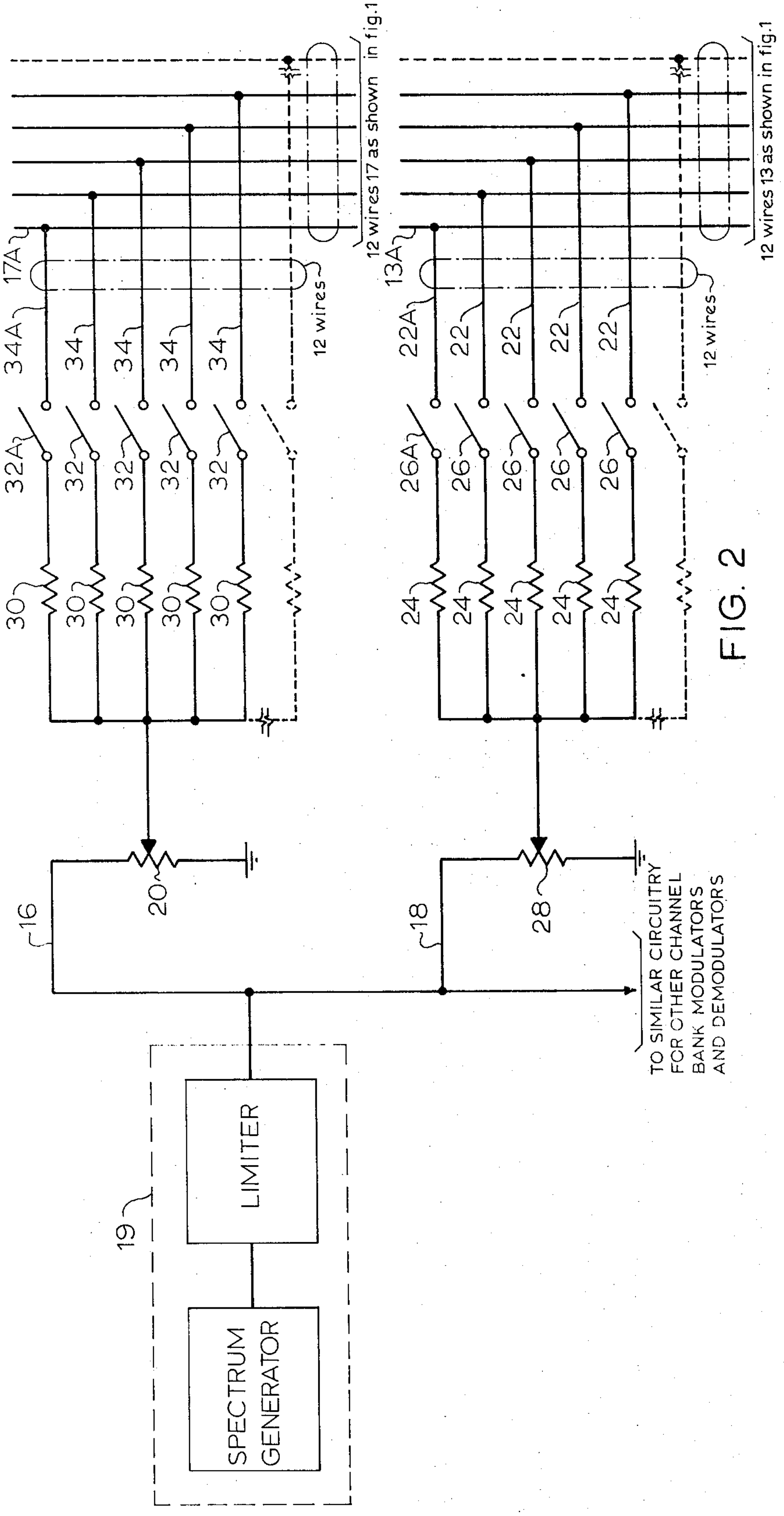
FIG. 2 shows circuitry for producing the disconnect tone.
Figure 3:
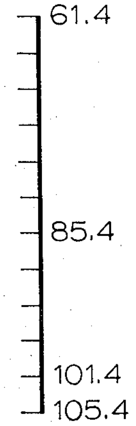
FIG. 3 shows a spectrum of signals at a location in FIG. 2.

FIG. 2 shows a preferred method of producing the spectrum of disconnect tone frequencies. It is noted that the switching signals are to be applied to the relevant channel bank demodulator inputs and the channel bank modulator outputs. Thus a spectrum generator of any desired design is provided to generate disconnect tone frequencies of 105.4 kHz., 101.4 kHz. and so on, at 4 kHz. intervals down to 61.4 kHz. representing the lower side band 2,600 Hz down from the basic carrier frequencies of 108, 104 . . . 64 kHz. As shown in FIG. 2, the spectrum is applied to a limiter designed to ensure that the disconnect tones in the spectrum are of about equal amplitude as shown in FIG. 3. The output of the limiter is applied to lines 16 and 18. If the limiter is not required to provide level signals, it may be omitted. Line 18 is connected to a potentiometer 28, to set the desired level for the group bank modulator outputs, the output of potentiometer 28 is connected to an individual line 22 corresponding to each channel bank modulator output. A resistance 24 (which may be made adjustable if desired for individual control) is provided in each line 22 to achieve isolation and impedance matching. Normally open relay contacts 26 interrupt each line 22 and these are under control of the means (well known but not shown) for detecting a failure in transmission through the multiplex system. The lines 22 are respectively connected to lines 13 as shown in FIG. 1.

Similarly, the outputs of the limiter are supplied along line 16 through a level adjusting potentiometer 20 and the output of the potentiometer 20 is connected through a plurality of lines 34 which contain a resistance 30 to achieve isolation and impedance matching, and normally open contacts 32 which are controlled and operate under the same conditions as the contacts 26. The lines 34 are respectively connected to lines 17 as shown in FIG. 1.

The detection of a failure in transmission (for closure of the appropriate relay contacts 26 and 32) is commonly achieved by inserting a pilot signal at a selected stage of a multiplexing heirarchy at the transmitting end of the multiplex system and determining whether it is received at a selected stage in the heirarchy at the receiving end. If the pilot transmission is not received, then a failure of transmission through the multiplex system or a part thereof is indicated. The character of the corrective action in the multiplexing heirarchy required by the detection of the transmission failure, will depend upon the scale of the failure detected in the multiplex heirarchy. In the embodiment shown, it is assumed that one pilot signal P in the specific embodiment shown, is inserted on one input line to the (here the far end) group bank modulator as shown. The pilot signal is customarily a signal within the spectrum of the input line to which it is applied but outside of the signalling band. For example, with the frequency spectrums and carrier frequencies discussed herein in relation to an input to a group bank modulator, frequencies of 104.08 kHz and 92 kHz have been used. The pilot inserted thus at the far end is detected at point PD (at the corresponding group bank demodulator) at the near end. Failure to receive the pilot signal inserted and detected as above set out, is interpreted as a failure at the level of an input to a group bank modulator or the output of a group bank demodulator. Accordingly, a relay contact 26 is provided for each line 22 and a relay contact 32 for each line 34 which corresponds to a group bank modulator input, so that these may be individually closed, and in response to a failure to receive the pilot at the stage shown, the line 34A corresponding to the group demodulator receiving the pilot, is connected to the relevant channel bank by the closure of switch 32A while the line 13A of the group bank modulator at the near end carrying the other direction for the near end transmission is connected to line 22A by the closure of switch 26A.

The spectrum of disconnect tones thus applied to line 17a causes disconnect switching of the telephone equipment connected to the outputs of the channel bank demodulator connected to line 17A; while the spectrum of switching signals applied to line 13A is transmitted over the multiplexing system and causes disconnection of telephone lines and trunks connected to the relevant group bank demodulator at the far end. The far end of the multiplex system will, of course, also be provided with similar equipment (not shown) for supplying the spectrum of switching tones at the counterpart locations in the event of transmission failure detected at the far end.

In the operation of the circuitry shown, with the multiplex system operating properly, all switches 26 and 32 will be open, a plurality of calls and data transmission will be in progress on various ones of the inputs to the channel bank modulators; and the information on such inputs will be modulated on carriers and multiplexed in the multiplexing system in a well known manner. In two-way multiplex transmission, the transmitted multiplex signal in one multiplex system, is accompanied by a received multiplex signal. In the other multiplex system, which is demodulated in accord with well known techniques and thus for each two-way call in progress to each input 11 to a channel bank demodulator there is a corresponding output 9 from a channel bank demodulator.

When a failure or group transmission is detected, by means not shown, at the near end receiving multiplex, then the failure of detection means causes closure of the proper contact 26 and the proper contact 32 corresponding in each case to the channel modulator associated with the transmission failure and the counterpart near end channel bank modulator carrying the other half of the two-way message. The closure of the relevant contact 26 and the relevant contact 32 is effective to connect the spectrum of disconnect tones to the input path of the near end receiving channel bank demodulator and the output path of the near end transmitting group bank modulator. The spectrum of disconnect tones is applied over the closed contacts 26 and 32 as described and carries disconnect tones corresponding to each carrier in the paths to which the spectrum is added when modulated by the 2,600 Hz tone. At the time of addition of the signals to the carrier path, each carrier corresponding to one of the disconnect tones, will be modulated by the existing idle tone (2,600 Hz in the example) or by information, or there may be no signal because of the transmission failure. The superimposed disconnecting disconnect tones will of course have no effect on those connected telephone lines already receiving the same frequency signal in the form of the idle tone. On the other connected telephone lines the relevant disconnect tone from the spectrum will cause disconnection of respective connected telephone lines to stop calls in progress and to stop charging and stop the mass seizure of control equipment. Thus the spectrum of disconnect tones provides tones to disconnect connected telephone lines at the near end through the channel bank demodulator and causes disconnection of connected telephone lines at the far end by causing transmission of the spectrum of disconnect tones added to the output of the channel bank modulator to provide at the connected lines at the far end of 2,600 Hz tone effecting disconnection.

It will thus be seen that the provision of the spectrum of disconnect tones and the addition of these responsive to system failure has been achieved with a minimum of circuitry and hardware.

It will be noted that the equipment as shown, has been designed to respond to detection of transmission failure at the group level and hence the spectrum of tones is applied selectively to the various group modulator inputs and group demodulator outputs. However, with the circuitry and spectrum of disconnect tones as shown, detection may be made at the supergroup level in which case it would be desirable, in response to a failure of transmission, to disconnect all group demodulator inputs associated with the transmission failure and all the counterpart group modulator outputs, at the same time. With this arrangement, the individual switches 26 or 32 shown in FIG. 2, would be replaced by uninterrupted lines and replaced by a single switch in each of the common lines 16 and 18 to provide connection of the whole spectrum of disconnect tones to the outputs of all channel bank modulators corresponding to a single supergroup modulator and the inputs of all channel bank demodulators corresponding to a single supergroup demodulator.

It will be appreciated that there may be a number of multiplexing systems in the same office. It will be appreciated that the source of the spectrum of disconnect tones may be used to service a number of multiplex systems utilizing the same carrier frequency with the selection of application being determined by the switches provided.

It will also be noted that the description has referred to the provision of a spectrum of tones suitable for application to the channel bank modulator outputs and demodulator inputs. However, it will be appreciated that the invention is not limited to application of switching tones between the channel bank and group bank but may be applied at higher levels in the heirarchy. With these higher levels the required number of frequencies in the spectrum of disconnect tones must correspond to the number of channels (i.e., 60 switching frequencies at the supergroup level and 600 at the master group level and so on) to provide for each channel a signal of the frequency to provide the 2,600 Hz (or other disconnect used in the connected telephone system).

The spectrum of disconnect tones may be produced in many ways, through a spectrum generator as described, or alternatively can be produced by applying the required disconnect 2,600 Hz (or other tones) to all the inputs of a spare channel bank modulator and connecting its output to lines 16 and 18 for use, as shown. Similarly connection may be achieved at the supergroup level by use of the 2,600 Hz tone connected through the channel bank to each input of a group modulator, and so on. As an alternative to the provision of 2,600 Hz tone in this way, this tone may be supplied by a recorded tone on a tape continuously available to the modulator used to produce the disconnect tones with the 2,600 Hz tone interspersed with a recorded announcement that service has been interrupted.

Where two signals are required corresponding to each carrier on a multiplex path, a separate spectrum of switching signals, may be produced corresponding to each modulation frequency and then combined for addition to the multiplex path or added at the same time to the multiplex path.

I claim:

1. In a frequency division multiplex system for transmission of information as part of a telephone system;

wherein a plurality of channels are provided through said multiplex system, each channel including the frequency range of an information signal;

each channel being designed to carry a signal received from a telephone system;

the multiplex system being designed so that the such signal in each channel therein is modulated on a carrier, for transmission;

said multiplex system being further designed so that a plurality of carriers are combined on a common path for frequency division multiplex transmission, the plurality of carriers after transmission by the said multiplexing system being respectively reconverted to a plurality of signals for transmission over a telephone system, where the telephone system is of the type designed, on receipt of a signal resulting from a signal of predetermined frequency on a multiplex channel, to effect, in the telephone system, the switching associated with the termination of a call;

said multiplexing system being combined with means for detecting a transmission failure in the multiplex transmission system associated with said plurality of carriers;

the method comprising:

generating a spectrum of disconnect tones in one-to-one correspondence to said first-mentioned plurality of carriers, each of said disconnect tones having the frequency of the multiplex carrier of the pluraltiy to which it corresponds, when such carrier is modulated by a signal of said predetermined frequency, means responsive to the detection of failure of the multiplexing system for simultaneously supplying to said common path for said plurality of modulated carriers said spectrum of tones;

2. In a multiplex system for use with a telephone system, wherein information received from the telephone system is carried in signals within a predetermined frequency range, wherein each of said signals is modulated on a carrier for frequency division multiplexing, and is demodulated from the carrier for use by the telephone system connected thereto, said telephone system including switching means operable by a signal of preselected frequency within said frequency range, to perform switching consequent upon the termination of a call, and wherein said multiplex system includes means for transmitting a plurality of such modulated carriers over a common path, and means for detecting a failure in the transmission over said multiplex system; the improvement comprising:

means for generating a spectrum of disconnect tones, each such disconnect tone corresponding to the frequency of a carrier of said plurality carried on such common path when modulated by a signal ofaid preselected frequency, and means responsive to the detection of a failure in transmission for simultaneously applying said spectrum of tones to said common path.

3. In a frequency division multiplex system for use with a telephone system, which includes a common path for a plurality of carriers, said multiplex system being so designed that each carrier is modulated in accord with an information signal received from a telephone system, and said multiplexing system is so designed that each carrier may carry a signal of predetermined frequency modulated thereon to cause, in a telephone system receiving said signal, the switching consequent upon termination of a call, said multiplex system including means for detection of a failure of transmission associated with said plurality of carriers; the improvement comprising:

means providing a spectrum of disconnect tones, each tone in said group of disconnect tones having the frequency of a carrier on said common path when modulated by a signal of said predetermined frequency, and means responsive to the detection of a failure in transmission to simultaneously apply said spectrum of disconnect tones to said common path.

4. In a frequency division multiplex system for use with a telephone system, including means for modulating information signals received from the telephone system on carriers and demodulating information signals from carriers for use on a telephone system, and means for combining a plurality of carriers for transmission together on a common path over said multiplexing system and separating such plurality of carriers, wherein said information signals so modulated on carriers are provided with predetermined channels through said multiplexing system, wherein a predetermined frequency signal modulated on one of said carriers, results in a signal in a telephone trunk or line connected to receive the information on said channel, which causes switching incidental to disconnection of said trunk or line, means for providing for connection at a predetermined portion of said common path, but normally disconnected therefrom, of means for generating a spectrum of disconnect tones of the respective frequencies of individual carriers at that portion when modulated by said predetermined frequency signal, means responsive to the detection of a failure of transmission, in said multiplex system, to cause connection of said spectrum of disconnect tones to said path.

5. In a frequency division multiplex system for use with a telephone system, wherein, at a stage in the multiplexing heirarchy, a common transmission path is provided for a plurality of carrier signals of different frequencies where each of said carriers may be modulated to carry information, wherein said multiplexing system is combined with means for detecting transmission failure therein, where a carrier in said path when modulated by a signal of predetermined frequency will produce in the telephone system circuitry receiving said signal, a signal to effect disconnection of telephone switching equipment: the improvement comprising means for generating a spectrum of disconnect tones including a tone corresponding in frequency to that of each of the carriers on said path when such carrier is modulated to carry said predetermined frequency, said spectrum of disconnect tones being normally disconnected from said path, but connectible in response to the detection of transmission failure in the multiplex system to simultaneously supply said spectrum of tones to said common transmission path.

6. In a multiplex system for use with a telephone system, wherein, at a stage in the multiplexing heirarchy, a common transmission path is provided for a plurality of carrier signals of different frequencies where each of said carriers may be modulated to provide an information channel; wherein said multiplexing system is combined with means for detecting transmission failure therein, wherein a carrier of said plurality, when modulated by a signal of predetermined frequency, will produce in a telephone system connected to receive the information modulated on said channel, a signal to indicate an idle channel to telephone switching equipment; the improvement comprising: providing a source for generating a spectrum of disconnect tones, including disconnect tones respectively corresponding to the frequency of individual ones of said carriers when modulated by said predetermined frequency, said source being normally disconnected from said path, and means for connecting said source to said path in response to the detection of transmission failure, to supply said spectrum of disconnect tones to said common transmission path.

7. In a multiplex system for use with a telephone system, wherein, at a stage in the multiplexing heirarchy, a common transmission path is provided for a plurality of carrier signals where each of said carriers may be modulated to provide an information channel, wherein said multiplexing system includes means for detecting transmission failure therein, wherein a carrier of said plurality, modulated by a signal of predetermined frequency, will produce in the telephone system receiving said signal, a signal to effect disconnection of telephone switching equipment, the method of:

generating a spectrum of disconnect tones, where each of the tones corresponds to the frequency of a carrier in said common transmission path when modulated by a signal of said pre-determined frequency, responsive to the detection of transmission in the multiplex system, providing to said common transmission path said spectrum of disconnect tones.

8. In a frequency division multiplex system for use with a telephone system, including means for modulating information signals received from the telephone system on carriers and demodulating information signals from carriers for use on a telephone system, and means for combining a plurality of carriers for transmission together over a common transmission path in said multplexing system and separating such plurality of carriers, wherein said information signals so modulated on carriers are provided with predetermined channels on said common transmission path, wherein a predetermined frequency signal modulated on a carrier in said common transmission path, results in a signal in a telephone trunk or line connected to receive the information on the corresponding channel, which causes switching incidental to disconnection of said trunk or line, the method comprising:

generating a spectrum of disconnect tones having frequencies respectively corresponding to the respective frequencies of individual carriers on said common transmission path in said multiplex system when said individual carriers are respectively modulated by said predetermined frequency signal, and responsive to the detection of a failure of transmission in said multiplex system, supplying said spectrum of disconnect tones to said path.

9. In a frequency division multiplex system for use with a telephone system, wherein, at a stage in the multiplexing heirarchy, a common transmission path is provided for a plurality of carrier signals of different frequencies where each of said carriers may be modulated to carry information, wherein said multiplexing system is combined with means for detecting transmission failure therein, where a carrier in said path when modulated by a signal of predetermined frequency will produce in the telephone system circuitry receiving said signal, a signal to effect disconnection of telephone switching equipment, the method comprising:

generating a spectrum of disconnect tones including a signal corresponding in frequency to that of each of the carriers on such path when modulated to carry said predetermined frequency, maintaining said source normally disconnected from said path, responsive to the detection of a failure of transmission in said multiplex system supplying said spectrum of disconnect tones to said path.

10. In a multiplex system for use with a telephone system, wherein, at a stage in the multiplexing hierarchy, a transmission path is provided for a plurality of carrier signals of different frequencies where each of said carriers may be modulated to provide an information channel; wherein said multiplexing system is combined with means for detecting transmission failure therein, wherein a carrier of said plurality, when modulated by a signal of predetermined frequency, will produce in a telephone system connected to receive the information modulated on said channel, a signal to indicate an idle channel to telephone switching equipment, the method comprising:

generating a spectrum of disconnect tones, including tones respectively corresponding in frequency to the frequency of individual ones of the carriers in said common path when modulated by said predetermined frequency, maintaining said spectrum of tones normally unconnected to said path, and responsive to the detection of transmission failure, supplying said spectrum of disconnect tones to said path.

* * * * *